(12) United States Patent
Ozonat (10) Patent No.: US 7,930,593 B2
(45) Date of Patent: Apr. 19, 2011

(54) SEGMENT-BASED TECHNIQUE AND SYSTEM FOR DETECTING PERFORMANCE ANOMALIES AND CHANGES FOR A COMPUTER-BASED SERVICE

(75) Inventor: Mehmet Kivanc Ozonat, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 12/243,262

(22) Filed: Oct. 1, 2008

(65) Prior Publication Data

US 2010/0083055 A1  Apr. 1, 2010

(51) Int. Cl.
   *G06F 11/00* (2006.01)
(52) U.S. Cl. .......................................... 714/33
(58) Field of Classification Search .................... 714/33, 714/37
   See application file for complete search history.

(56) References Cited

U.S. PATENT DOCUMENTS

| | | | | |
|---|---|---|---|---|
| 7,484,132 B2 * | 1/2009 | Garbow | ............................. | 714/47 |
| 7,761,745 B2 * | 7/2010 | Garbow | ............................. | 714/47 |
| 2003/0110007 A1 * | 6/2003 | McGee et al. | ................. | 702/179 |
| 2004/0228186 A1 * | 11/2004 | Kadota | ........................... | 365/202 |
| 2005/0182589 A1 * | 8/2005 | Smocha et al. | ................ | 702/121 |
| 2008/0016412 A1 * | 1/2008 | White et al. | ....................... | 714/48 |
| 2008/0059856 A1 * | 3/2008 | Lee et al. | ........................ | 714/728 |
| 2008/0244319 A1 * | 10/2008 | Nehab et al. | ..................... | 714/38 |

OTHER PUBLICATIONS

Carreira-Perpinan, Miguel "Mode-Finding for Mixtures of Gaussian Distributions" IEEE Transactions on Pattern Analysis and Machine INtelligence, vol. 11, No. 11, Nov. 2000.*
Kezunovic, Mladen "Detect and Classify Faults Using Neural Nets" IEEE 1996.*
wikipedia.org"Data clustering".*
Widodo, Achmad "Combination of independant component analysis and support vector for intelligent faults diagnosis of induction motors" elsevier 2005.*
Wolf, John H "Pattern Clustering by Multivariate Mixture Analysis" Jul. 1970.*
Schreiber et al, "Classification of Time Series Data with Nonlinear Similarity Measurers" Physical Review Letters Aug. 25, 1997.*

* cited by examiner

*Primary Examiner* — Bryce P Bonzo (57) ABSTRACT

A technique includes sampling at least one performance metric of a computer-based service to form time samples of the metric(s) and detecting an occurrence of an anomaly or a performance mode change in the service. The detection includes arranging the time samples in segments based on a statistical analysis of the time samples.

23 Claims, 3 Drawing Sheets

SEGMENT-BASED TECHNIQUE AND SYSTEM FOR DETECTING PERFORMANCE ANOMALIES AND CHANGES FOR A COMPUTER-BASED SERVICE

BACKGROUND

The performance of a large-scale distributed web service may be gauged by monitoring various performance metrics of the service, such as throughput, response time, etc. Anomalies in the performance metric behavior are often symptoms of service problems that lead to loss of revenue for the service providers and reduced satisfaction of the service users. Therefore, performance management tools typically are used for purposes of detecting anomalies in the performance metric behavior in order to diagnosis and recover from service performance problems and minimize impact of the problems on the service providers and service users.

A traditional approach to detect a performance anomaly involves detecting when a particular performance metric passes a threshold. The threshold may be set either manually or automatically. Setting a threshold manually may be challenging due to such factors as the occurrence of different normal performance modes and a large number of monitored performance metrics. Automatically determining the threshold settings for a performance metric may involve determining a statistical distribution of a historical measurement of the performance metric. For example, thresholds may be set at the fifth percentile and ninety-fifth percentile of the historical measurements of the performance metric; three standard deviations above and below the average, or mean, of the historical measurements; etc.

DETAILED DESCRIPTION

Figure 1:
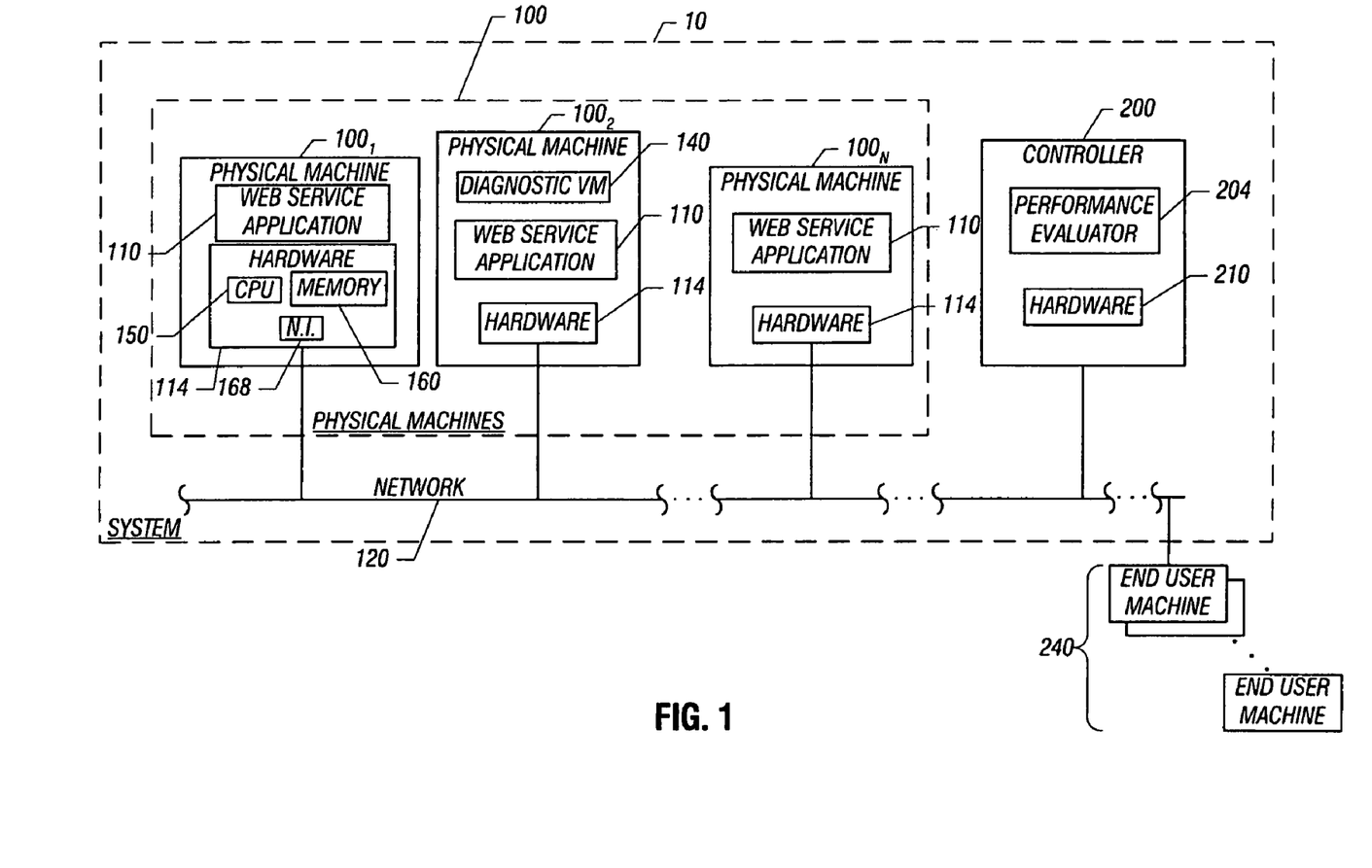
FIG. 1 is a block diagram of a system of physical machines that are connected by a network according to an embodiment of the invention.

Referring to FIG. 1, a system 10 in accordance with the invention includes M physical machines 100 (physical machines $100_1$, $100_2$ ... $100_M$ being depicted in FIG. 1 as examples), which are interconnected by a network 120. As examples, the network 120 may be a local area network (LAN), a wide area network (WAN), the Internet, a combination of any of these networks, or any other type of communication link. The network 120 may include system buses or other fast interconnects, which are not depicted in FIG. 1. Each physical machine 100 may be located within one cabinet (or rack), or alternatively, the physical machine 100 may be located in multiple cabinets (or racks).

As non-limiting examples, the system 10 may be an application server farm, a storage server farm (or storage area network), a web server farm, a switch, a router farm, etc. Although three physical machines 100 are depicted in FIG. 1, it is understood that the system 10 may contain fewer or more than three physical machines 100, depending on the particular embodiment of the invention.

As examples, the physical machine 100 may be a computer (e.g., application server, storage server, web server, etc.), a communications module (e.g., switches, routers, etc.) and/or other types of machine. The language "physical machine" indicates that the machine is an actual machine made up of software and hardware. Although each of the physical machines 100 is depicted in FIG. 1 as being contained within a box, a particular physical machine 100 may be a distributed machine, which has multiple nodes that provide a distributed and parallel processing system.

In accordance with some embodiments of the invention, the system 10 provides a computer-based service, such as (as a non-limiting example) a large-scale distributed web service (a web service that employs servers that are located on different continents, as a non-limiting example) to end user computers 240. As examples, the computer-based service may be a financial service, an inventory service, an accounting service, a storage service, an information technology service, etc. Additionally, the computer-based service may be a non-web-based service, such as a service that is provided over a private network; a service that is provided as part of a local area network (LAN) or wide area network (WAN); a service that is based on a particular operating system and/or programming language; etc. Thus, many variations are contemplated and are within the scope of the appended claims.

As a non-limiting example, as depicted in FIG. 1, each physical machine 100 may include one or more web services applications 110 such that the physical machines 100 operate collectively to provide a distributed web service (i.e., an exemplary computer-based service). In order to detect performance anomalies and changes in the web-based service, the system 10 includes a performance evaluator 204 that, as described herein, uses a thresholdless, segment-based approach to detect anomalies and changes in the performance metric behavior of the web service for purposes of accurately and timely diagnosing and recovering from service performance problems and minimizing the impact of any such problems on the service providers and service users.

In general, a segment is a set of contiguous time samples of one or more performance metrics, which exhibit similar performance metric behavior. As described below, the performance evaluator 204 discovers the segments using information-theoretic and statistical learning techniques; and the performance evaluator 204 clusters like segments together so that the results of the clustering may be analyzed to detect those segments with different performance behavior and/or anomalous performance behavior.

As depicted in FIG. 1, in accordance with some embodiments of the invention, the performance evaluator 204 may be located on a separate physical machine 200 of the system 10 and may be coupled to the physical machines 100 by the network 120. Thus, the performance evaluator 204 may be executed by hardware 210 of the physical machine 200 for purposes of sampling and processing performance metrics of the web-based service, as described herein. However, other variations are contemplated and are within the scope of the appended claims. In this regard, the performance evaluator 204 may be distributed over several physical machines, may be located on one or more of the physical machines 100, etc.

Figure 2:
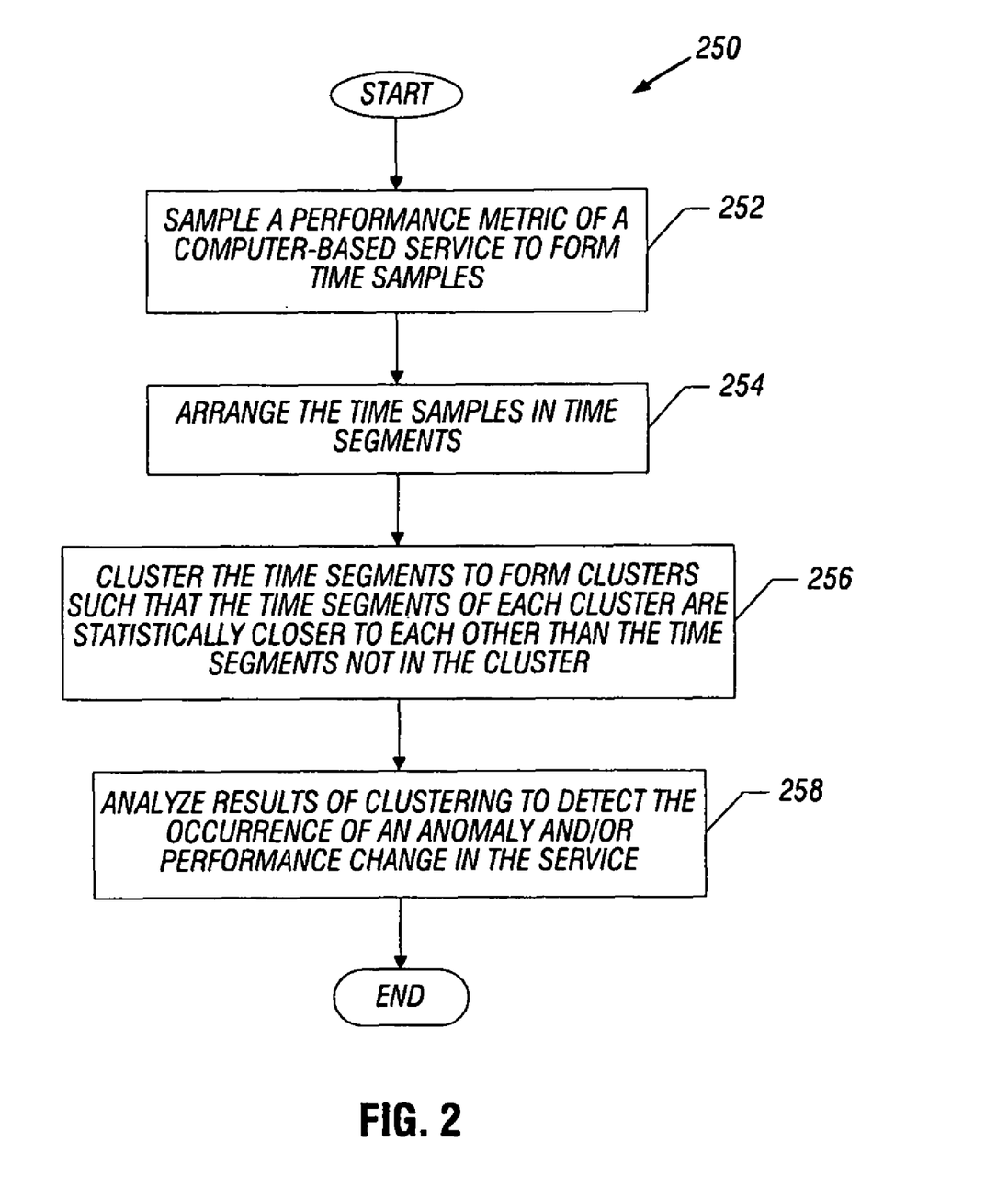
FIG. 2 is a flow diagram depicting a segment-based technique to detect performance anomalies and changes in a computer-based service according to an embodiment of the invention.

Referring to FIG. 2 in conjunction with FIG. 1, in accordance with some embodiments of the invention, a technique 250 may be generally performed for purposes of detecting anomalies and performance modes in a computer-based service. For example, a response time of the service may be monitored as a performance metric. Using the technique 250, one or more periods of time may be identified in which the response time exhibits anomalous behavior. Furthermore, using the technique, different modes of operation of the service may be identified. For example, the response time may generally vary among "normal" modes of operation, such modes in which backup operations are being performed, modes in which user workload is higher, etc.

The technique 250 may be performed partially or fully performed by the performance evaluator 204, depending on the particular embodiment of the invention. The technique 250 includes sampling (block 252) a performance metric of a computer-based service (a large scale distributed web service, for example) to form time samples and arranging (block 254) the time samples in non-overlapping time segments. As an example, the performance evaluator 204 may sniff network communications for purposes of sampling the performance metric. Each time segment contains a contiguous set of time samples of the performance metric. The time segments are clustered (block 256) to form clusters such that the time segments of each cluster are statistically closer to each other than the time segments, which are not in the cluster. The results of the clustering are analyzed (block 258) to detect the occurrence of an anomaly and/or performance change in the computer-based service.

Depending on the particular embodiment of the invention, the performance evaluator 204 may analyze the results of the clustering to automatically identify outliers, which indicate anomalies, or the results of the clustering may be analyzed by a human operator to identify the anomalies. The clustering may be manually or automatically analyzed for purposes of identifying performance modes of the service. Additionally, as further described herein, in accordance with some embodiments of the invention, the segmentation itself may be used for purposes of detecting the occurrence of an anomaly and/or performance change in the computer-based service. Therefore, depending on the particular embodiment of the invention, the performance evaluator 204 may automatically analyze the results of the segmentation to automatically identify anomalies or performance modes or the results of the segmentation may be analyzed by a human operator for purposes of identifying performance mode and/or anomalies. Thus, many variations are contemplated and are within the scope of the appended claims.

As a non-limiting example, the segments may be modeled using a parametric, Gaussian mixture distribution, where each component of the mixture represents a segment. The performance evaluator 204 discovers locations of segments (i.e., the time sample at when a segment starts or ends) and the segment characteristics (i.e., the statistical character of the segments such as mean vectors and covariance matrices) by minimizing a statistical distance between the true, unknown distribution of the metrics and the Gaussian mixture model. When a new segment is discovered, the performance evaluator 204 determines a statistical distance between the new segment and the previous (or historical) segments for purposes of determining whether the new segment is statistically similar to the previous segments (i.e., expected or normal behavior) or statistically different from the previous segments, which flags the new segment as possibly being a performance anomaly.

The segment-based approach makes it possible to take into account the temporal relationships among the performance metrics, thereby increasing the detection accuracy. Further, characterizing the segments statistically provides a good understanding of the changes in the performance metric behavior across time, helping with the diagnosis of anomalies and the detection of multimodal performance metric behavior. Finally, the approach also provides the ability to treat multiple performance metrics jointly through multivariate Gaussian mixture distributions.

The segment-based approach that is described herein provides an intrinsic trade-off between the time to detect an anomaly and the magnitude (or amplitude) of the anomaly. In other words, anomalous periods with large amplitude deviations from normal behavior are detected rapidly, while anomalous periods with moderate amplitude deviations are associated with relatively longer detection times.

The performance metrics collected over time may be viewed as consisting of temporal segments, where a segment is a set of contiguous time samples such that the time samples within the segment are more similar (in terms of their performance metric behavior) to one another than the time samples in the previous and next segments. An information-theoretic approach is described herein for purposes of discovering the segments.

"Discovering" the time segments refers to discovering the number of segments, the time samples at when each segment starts and ends, and the statistical character mean vectors and covariance matrices of the segments. At set forth below, in accordance with some embodiments of the invention, the segments are modeled using Gaussian distributions, and the performance evaluator 204 discovers the segments by minimizing a statistical distance criterion. It is assumed unless otherwise noted that the segments are discovered "offline," or discovered from historical data from the past month or past year. However, as further described below, the segments may be discovered "online" from samples of a more recent performance metric. Thus, many variations are contemplated and are within the scope of the appended claims.

In the following discussion, "X" refers to an L-dimensional vector of performance metrics, and "L" refers to the number of performance metrics of the distributed service. For example, "L" is equal to six for three applications where each application has two performance metrics (e.g., response time and throughput). The segments are indexed by "m," and the true (and unknown) underlying statistical distribution of X in segment m is denoted by "$f_m(X)$" with an occurrence ratio of "$p_m$". More specifically, the occurrence ratio "$p_m$" refers to the ratio of the number of time samples in segment m to the total number of time samples. Thus, $\Sigma_m p_m = 1$. The underlying statistical distribution (called "f") of the metric vector X may be expressed as a weighted sum of the segment distributions $f_m(X)$ as follows:

$$f(X) = \sum_m p_m f_m(X). \qquad \text{Eq. 1}$$

It follows from the central limit effect in nature that the cumulative effect of a large number of independent, random processes leads to a Gaussian distribution. In large-scale distributed web services, each collected performance metric reflects a large number of independent, random processes (e.g., requests from a large number of service users, the measurement noise introduced by the hardware components hosting the service, etc.), therefore making the Gaussian distribution a reasonable approximation for the segment behavior. Following the central limit effect, the segment m (having distribution $f_m$) may be modeled with a Gaussian distribution called "$g_m$". This implies that the distribution f(X) of the metric vector is modeled by a Gaussian mixture distribution.

A Gaussian mixture distribution, called "g(X)," is a weighted sum of a finite number of Gaussians where the non-negative weights sum to one, as described below:

$$g(X) = \sum_m p_m g_m(X). \qquad \text{Eq. 2}$$

In Eq. 2, the occurrence ratio $p_m$ is greater than zero and is the probability of occurrence of the $m^{th}$ component (i.e., the ratio of times X arises from the $m^{th}$ mixture component distribution) with $\Sigma_m p_m = 1$. Therefore, the Gaussian mixture $g_m(X)$ may be alternatively described as follows:

$$g_m(X) = \frac{1}{(2\pi)^{L/2}|\Sigma_m| e^{-\frac{1}{2}(x-\mu_m)\sum_m^{-1}(X-\mu_m)^T}}, \qquad \text{Eq. 3}$$

where "$\mu_m$" and "$\Sigma_m$" refers to the mean vector and the non-singular covariance matrix, respectively, of the $m^{th}$ mixture component.

The Gaussian mixture distribution g(X) is used for modeling data in many disciplines (e.g., statistical learning), and its popularity arises from a number of factors, including the robustness of the Gaussian distribution, the central limit effect in nature, and the analytical tractability of the Gaussian distribution.

The relative entropy (aka the Kullback-Leibler distance), called "$I(f_m||g_m)$," between two distributions (such as $f_m$ and $g_m$) is a measure of the statistical distance between the two distributions. In particular, $I(f_m||g_m)$ measures the inefficiency due to modeling $f_m$ by the distribution $g_m$. The relative entropy is defined as the expected logarithm of the likelihood ratio between $f_m$ and $g_m$, as set forth below:

$$I(f_m||g_m) = \left[E(\log \frac{f_m(X)}{g_m(X)})\right], \qquad \text{Eq. 4}$$

where the expectation (called "E") is taken over $f_m$. The relative entropy is lower bounded by zero, which occurs when $f_m$ equals $g_m$.

A statistical distance, called "$D_{f,g}$," may be defined between the true and unknown metric distribution f and its Gaussian mixture model g as the weighted sum of the relative entropies between the (true and unknown) distributions of the segments $f_m$ and their Gaussian models $g_m$, as set forth below:

$$D_{f,g} = \sum_m p_m I(f_m||g_m), \qquad \text{Eq. 5}$$

The distance, $D_{f,g}$, is also known as mismatch in information theory. The distance, $D_{f,g}$ may be alternatively expressed as follows:

$$D_{f,g} = \sum_m p_m I(f_m||g_m) \qquad \text{Eq. 6}$$

$$= -\sum_m p_m h(f_m) + \frac{1}{2}\sum_m p_m \log((2\pi e)^L |\Sigma_m|)$$

$$= -h(f) - \sum_m p_m \log p_m + \frac{1}{2}\sum_m p_m \log((2\pi e)^L |\Sigma_m|),$$

where "h(f)" represents the entropy of f.

Under the distance criterion $D_{f,g}$ the Gaussian mixture model that provides the best representation of the metrics is the one that minimizes Eq. 6 over all possible Gaussian mixtures (i.e., over all possible segmentations of the time samples). Since Eq. 6 is to be minimized over Gaussian mixtures, the term "h(f)" and the term "$\log(2\pi e)^L$" are independent of the minimization (i.e., they are constants with respect to the minimization). Therefore, the minimization of Eq. 6 is equivalent to minimizing the following expression:

$$-\sum_m p_m \log p_m + \frac{1}{2}\sum_m p_m \log(|\Sigma_m|). \qquad \text{Eq. 7}$$

As described below, in accordance with embodiments of the invention, the performance evaluator 204 discovers the Gaussian mixture by model minimizing over all possible Gaussian mixture models (i.e., over all possible segmentations of the time samples). The discovery of the Gaussian mixture model includes finding the number of segments, the locations of the segments (i.e., the time samples at when each segment starts and ends), and the parameters ($p_m$, $\mu_m$ and $\Sigma_m$) of each segment model $g_m$. It is noted that the mean vector parameter $\mu_m$ is implicit in Eq. 7 within the covariance matrix parameter $\Sigma_m$.

The above derivations assume that time samples follow Gaussian distributions. This assumption may be violated for some time samples, especially when the time samples reflect anomalous behavior. Thus, the model is extended to account for time samples that reflect non-Gaussian behavior. Accounting for the non-Gaussian behavior, the underlying distribution f may be described as follows:

$$f(X) = (1-\lambda)f_e(X) + \lambda \sum_m p_m f_m(X), \qquad \text{Eq. 8}$$

where "$f_e$" denotes the non-Gaussian distributions, and "$\lambda$" refers to the ratio of the Gaussian time samples to the total number of time samples and is between zero and one, inclusive. In accordance with embodiments of the invention, $\lambda$ is a user-set value, which is analogous to the user-set thresholds used in threshold-based detection.

Given the foregoing relationship, the statistical distance, $D_{f,g}$ may be expressed as follows:

$$D_{f,g} = \sum_m p_m I(f_m||g_m) \qquad \text{Eq. 9}$$

$$= -\lambda \sum_m p_m h(f_m) + \frac{1}{2}\sum_m p_m \log((2\pi e)^L |\Sigma_m|) + c(\lambda)$$

$$= -\lambda h(f) - \lambda \sum_m p_m \log p_m +$$

$$\frac{1}{2}\sum_m p_m \log((2\pi e)^L |\Sigma_m|) + c(\lambda),$$

where "h(f)" represents the entropy of f; and "$c(\lambda)$" is a function of $\lambda$.

Because Eq. 9 is to be minimized over Gaussian mixtures, the terms h(f), $\log(2\pi e)^L$, and $c(\lambda)$ are independent of the minimization (i.e., they are constants with respect to the minimization). Therefore, the minimization of Eq. 9 is equivalent to minimizing the following:

$$-\lambda \sum_m p_m \log p_m + \frac{1}{2} \sum_m p_m \log(|\Sigma_m|).  \quad \text{Eq. 10}$$

The summation $\Sigma_m$ in Eq. 10 is a Lagrangian sum of two terms with a user-set value $\lambda$. The term $$\frac{1}{2} \sum_m p_m \log(|\Sigma_m|)$$

in Eq. 10 penalizes large covariance determinants (in the L=1 case, it penalizes large variances), forcing the segments to be homogeneous in terms of performance metric behavior. The term $-\Sigma\, p_m \log p_m$ in Eq. 10, on the other hand, is the information-theoretic entropy of the segment lengths, and it increases monotonically as the segments are split to form new segments. Thus, while the first term penalizes the non-homogeneity of the segments, the second term penalizes the existence of a large number of segments. One outcome of this trade-off is to provide a compact representation (i.e., as few segments as possible) of the metrics, while ensuring that each segment is as homogeneous as possible. The value of $\lambda$ determines the direction of the trade-off: higher values of $\lambda$ put more weight on the entropy term, leading to a more compact representation with less segment homogeneity, while lower values of $\lambda$ put less weight on the entropy term, leading to a less compact representation with more segment homogeneity.

Segment m's contribution to Eq. 10, called "$w_m$" may be described as follows:

$$w_m = -\lambda p_m \log p_m + \frac{1}{2} p_m \log(|\Sigma_m|). \quad \text{Eq. 11}$$

The goal is to find the segmentation that minimizes $\Sigma_m w_m$. A segment can be represented either by an index (e.g., m) or by the time samples at when it starts and ends. Thus, $w_m$ can be alternatively expressed as $w_{i,j}$, where i and j are the start and end time samples of the segment. There is a one-to-one correspondence between indices m and the (i, j) pairs. The minimization goal can then be re-expressed as finding the segmentation that minimizes the following:

$$\sum_m w_{i,j}. \quad \text{Eq. 12}$$

For an ordered set of N samples with segment costs $w_m$ or $w_{i,j}$, the segmentation that minimizes $\Sigma_m w_{i,j}$ may be found by the following pseudo code:

Step (i)
  Set n=1, and set $s_1 = w_{1,1}$;
Step (ii)

Set $n = n + 1$, and set $s_n = \min_{1 \le k < n}(s_k + w_{k,n})$, and $k_n = \operatorname{argmin}_{1 \le k < n}(s_k + w_{k,n})$.

Step (iii)
  If n<N, return to step (ii). Otherwise, stop.

In the algorithm above, "$s_n$" refers to the minimum of Eq. 12 over the first n samples, and the optimum segmentation of the first n samples is the optimum segmentation of the first $k_n$ samples (already found in step $k_n$) appended by the single segment that extends from sample $k_n$ to sample n. Accordingly, the algorithm above may be performed by the performance evaluator 204 to find the optimum segmentation of the metric data. The $w_{i,j}$ terms are provided in Eq. 11 (except that the segments in Eq. 11 are denoted by index m instead of by start and end points (i, j)), and "N" is the number of time samples. The segment lengths to a minimum of L+1 to avoid covariance singularities.

After the performance evaluator 204 identifies the segments, the evaluator 204 then selectively clusters the time segments, which aids in identifying anomalous behavior and/or normal performance mode changes.

In accordance with the embodiment of the invention, the performance evaluator 204 clusters the segments based on the statistical distances between them. In other words, segments that are statistically closer are clustered together. The clusters indicate modes of typical performance behavior, and provide a convenient way to detect performance changes and anomalies, as well as understanding the causes of the changes. Consider an exemplary scenario, where the performance behavior of a service application changes during particular database backup operations. For this scenario, two distinct clusters of performance behavior are expected: one cluster representing the "backup time" behavior and the other cluster representing the "usual" behavior. This helps the IT experts notice that the particular backup operation changes the performance behavior, and they can take action if necessary. Further, it provides an accurate performance anomaly detection/alert scheme: an alarm is generated if a segment does not get clustered into any of these two clusters (i.e., statistically far from both clusters); and an alarm is generated if a segment gets clustered to the "backup" cluster during a time period when there are no backup operations.

Clustering refers to the grouping of objects into subsets or "clusters" such that the objects within a cluster are more similar to one another than objects assigned to different clusters. Data clustering is used in many fields of statistical data analysis, including data mining, pattern recognition, image analysis and machine learning. To perform the clustering, a dissimilarity measure, or "distance," between the objects to be clustered is defined, and then, a clustering algorithm, such as k-means, k-mediods or hierarchical clustering, may be used to form the clusters such that, under this distance, the objects within each cluster are close to each other and far from the objects of other clusters.

Information-theoretic relative entropy may be used to define a statistical distance between two segments. The relative entropy between two Gaussians, $g_1$ and $g_2$ may be described as follows:

$$\begin{aligned} I(g_1, g_2) = &-h(g_1) + \frac{1}{2}\log(2\pi e)^L|\Sigma_1| + \\ & \left(\frac{1}{2}\log\frac{|\Sigma_2|}{|\Sigma_1|} + \frac{1}{2}\operatorname{Trace}(\Sigma_1\Sigma_2^{-1}) - \frac{L}{2}\right) + \\ & \frac{1}{2}(\mu_2 - \mu_1)^t \Sigma_2^{-1}(\mu_2 - \mu_1) + \\ & \left(\frac{1}{2}\log\frac{|\Sigma_2|}{|\Sigma_1|} + \frac{1}{2}\operatorname{Trace}(\Sigma_1\Sigma_2^{-1}) - \frac{L}{2}\right) + \\ & \frac{1}{2}(\mu_2 - \mu_1)^t \Sigma_2^{-1}(\mu_2 - \mu_1), \end{aligned} \quad \text{Eq. 13}$$

where "$\mu_1$" and "$\mu_2$" refer to the mean vectors of the Gaussians $g_1$ and $g_2$, respectively; "$\Sigma_1$" and "$\Sigma_2$" refer to the non-singular covariance matrices of the Gaussians $g_1$ and $g_2$, respectively. The entropy $h(g_1)$ may be described as follows:

$$h(g_1) = \frac{1}{2}\log(2\pi e)^L |\Sigma_1|.\qquad\text{Eq. 14}$$

Agglomerative hierarchical clustering may be used to form the clusters. Agglomerative hierarchical clustering is an iterative technique that begins with M clusters for M objects (i.e., each object is a cluster). At each iteration, the two "closest" clusters (i.e., closest under some distance criterion) are merged into a single cluster until some stopping criterion (such as some pre-defined number of clusters) is reached.

Starting with M clusters (where M is the number of discovered segments), the performance evaluator 204 applies agglomerative hierarchical clustering with the distance criterion that is set forth in Eq. 13. At each iteration, the performance evaluator 204 merges two clusters, whose closest segments are closest. In other words, at each iteration, for each pair of clusters, $c_i$ and $c_j$, the performance evaluator 204 determines distances between the segments of ci and the segments of $c_j$, and denotes the closest segment distance by $d_{i,j}$. The performance evaluator 204 merges two clusters with the minimum $d_{i,j}$ value. The iterations are halted when the sum of the occurrence ratios $p_m$ of the segments that got merged reaches a pre-defined threshold, called "$\epsilon$."

Offline detection refers to the detection of the anomalies and changes in the performance metric behavior over a period of time after all the metric data for that period is available. Offline detection is performed often on a weekly or monthly basis by performing detection on the performance metrics collected over the past week or month.

Offline detection is useful in detecting and understanding the changes in service performance and taking actions if necessary. The performance changes may be due to recurring causes (e.g., application maintenance or workload changes) or they may be due to one-time (or rare) events (i.e., anomalies). By relating each of the clusters and each of the anomalous segments (i.e., segments that do not get merged with any clusters) to IT operations (such as application maintenance), daily and weekly workload cycles, and the enterprise calendar (e.g., end-of-quarter periods may be busy, indicating different performance behavior), the IT experts can understand the causes of the changes and anomalies, and try to resolve them.

Offline detection may be performed by selecting values for $\lambda$ and $\epsilon$, and executing the performance evaluator to perform the segmentation and clustering. The IT experts may decrease $\lambda$ to increase the number of segments to focus in on the more granular temporal changes, or decrease $\epsilon$ to capture the more granular differences between the clusters.

The discussion above focuses on offline detection of performance anomalies and changes. As mentioned above, however, these techniques may be extended to online detection, i.e., the detection of performance anomalies and changes in real time as metric data are collected.

In accordance with some embodiments of the invention, each $w_{i,j}$ (or $w_m$), as given in Eq. 11, is computed only once, which aids in interpreting the segments and avoids computational complexity. As described below, Eq. 11 may also be used within an online algorithm, where the total number of time samples, N, is not fixed. More specifically, out of the two parameters of Eq. 11, $\Sigma_{i,j}$, i.e., the covariance of the time samples between the time sample i and the time sample j, does not depend on N. The other parameter $p_{i,j}$ however, is a function of N since it is an occurrence ratio. The parameter $p_{i,j}$ is the ratio of the number of time samples $n_{i,j}$ between time sample i and time sample j, to N. Thus, Eq. 11 may be alternatively expressed as follows:

$$\begin{aligned}w_{i,j} &= -\lambda p_{i,j}\log p_{i,j} + \frac{1}{2}p_{i,j}\log(|\Sigma_{i,j}|)\\&= -\lambda p_{i,j}\log\frac{1}{N} - \lambda p_{i,j} + \frac{1}{2}p_{i,j}\log(|\Sigma_{i,j}|)\end{aligned}\qquad\text{Eq. 15}$$

Focusing on the first term of Eq. 15, it is noted that the sum of $p_{i,j}$ log 1/N over any segmentation of N time samples is equal to log 1/N. Thus, all it does is to increase each segmentation cost sum, by the same amount, meaning that it does not have any impact on the outcome of the segmentation. Therefore, the first term may be dropped from Eq. 15. Further, the latter two terms of Eq. 15 may be alternatively expressed as follows:

$$-\lambda\frac{n_{i,j}}{N}\left(\log n_{i,j} + \frac{1}{2}\log(|\Sigma_{i,j}|)\right).\qquad\text{Eq. 16}$$

It is noted that N may once again be dropped from the minimization because N scales each $w_{i,j}$ by the same amount, and thus, has no effect on the minimization. By replacing Eq. 11 with Eq. 16, the segmentation algorithm leads to the same result, and is independent of N. The performance evaluator 204 may therefore discover the segments in an online fashion, where N keeps changing.

The time spent in discovering an anomalous segment depends on the magnitude of the performance anomaly. If the deviation of the anomalous segment from the normal performance behavior is very high, then the time to detection is relatively short, such as a time as short as one time sample (i.e., immediate), as a non-limiting example. If the deviation of the anomalous segment is only moderate, then the time to detection increases. However even in more moderate cases, the time to detection has been observed to be within a maximum of three time samples. Other detections are contemplated in other embodiments of the invention.

It is noted that segmentation alone may be sufficient for purposes of detecting anomalies and performance modes, in accordance with some embodiments of the invention, if there is prior knowledge about the times at which performance problems were detected. For example, anomalies may be associated with a large amount of segmentation (i.e., a large number of segments) in the times which performance problems were detected. Thus, an anomaly in a particular performance metric may be exhibited by a large amount of segmentation during the problem period.

Figure 3:
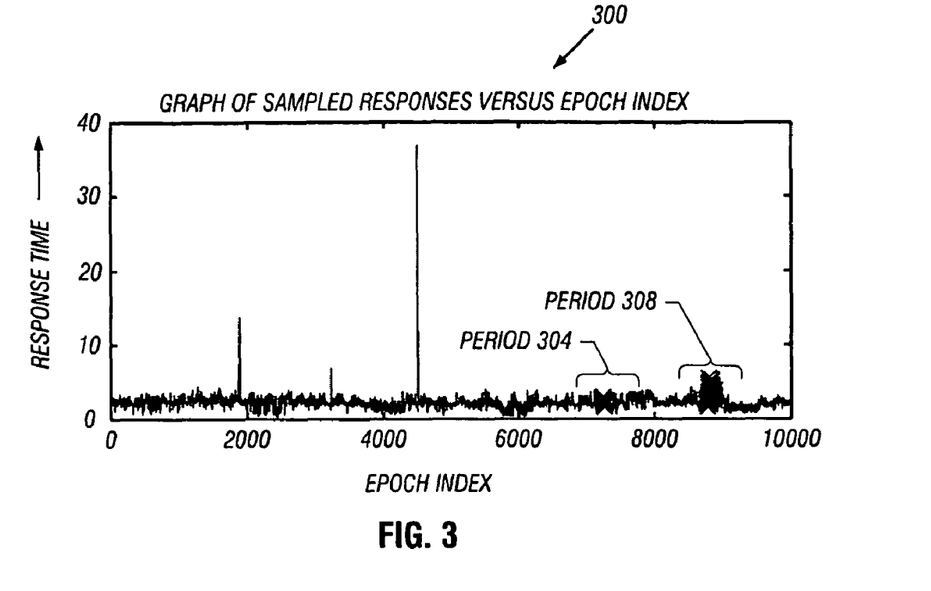
FIG. 3 depicts time samples of a response time of an exemplary web service according to an embodiment of the invention.
Figure 4:
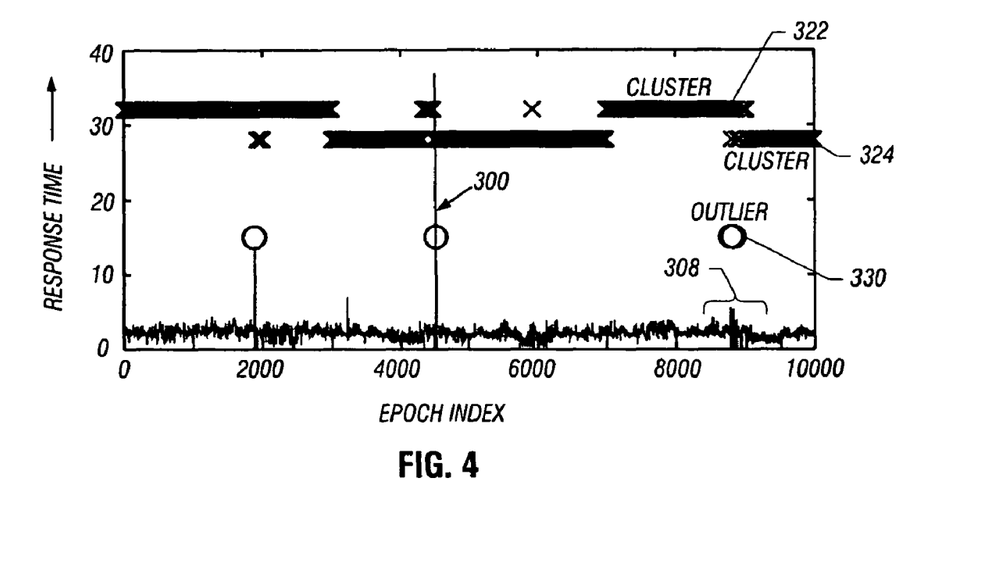
FIG. 4 illustrates segmentation and clustering of the time samples depicted in FIG. 3 according to an embodiment of the invention.

In other embodiments of the invention, segmentation and clustering may be used to detect performance modes and anomalies. FIGS. 3 and 4 illustrate an exemplary application of the segmentation and clustering to samples of a performance metric of a large scale distributed web service. For this example, the performance metric is a response time of the large scale distributed web service, and the response time is sampled (as depicted by a graph 300 of sampled responses versus an epoch index in FIG. 3) over a period of two weeks. The samples, or epochs, are separated by fifteen minutes. For this example, performance anomalies are assumed to occur during two time periods 304 and 308.

Referring to FIG. 4, by applying segmentation and clustering, two clusters 322 and 324 are identified. For this example, for segmentation, the λ value was set to a relatively low value to allow for a large number of segments, and the ε threshold was set to 0.99. In light of the discovery of the two segments, a bi-modal performance behavior is discovered. As examples, the two different performance modes may be attributable to the running of a backup process, user workloads at different times of the day, etc. The mean and standard deviation of the cluster 322 is 2.7 and 0.25, respectively; and the mean and standard deviation of the cluster 324 is 1.8 and 0.25, respectively. Thus, the two clusters 322 and 324 are separated by more than three standard deviations, a separation which indicates a clear distinction between the two behaviors.

The time segments that were not clustered are outliers, which are denoted by the circles in FIG. 4, such as a circle 330 that corresponds to the period 308 in which a performance anomaly was detected. Therefore, segmentation and clustering of the sampled response time is used to detect the anomaly in the period 308.

It is noted that the segmentation and clustering for this example does not identify the anomaly that occurs during the period 304, as this anomaly is not detectable by monitoring the response time of the web service. Instead the anomaly during the period 304 may be detected by sampling another performance metric (such as a response time of an external service that is called by the web service, as non-limiting example) or by sampling a combination of performance metrics.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    sampling at least one performance metric of a computer-based service to form time samples of said at least one performance metric;
    arranging the time samples in segments based on a statistical analysis of the time samples;
    comparing at least some of the segments; and
    identifying, based on the comparison of the segments, a particular one of the compared segments as being associated with characteristics of the at least one performance metric that are different than characteristics of the at least one performance metric that are associated with the other compared segments.

2. The method of claim 1, wherein comparing the segments comprises:
    clustering the segments to form clusters such that the segments of each cluster are statistically closer to each other than the segments not in the cluster.

3. The method of claim 2, wherein the act of clustering comprises determining statistical distances among the segments.

4. The method of claim 1, wherein the comparing of the segments occurs as the sampling is being performed.

5. The method of claim 1, wherein the act of performing the statistical analysis comprises:
    minimizing a statistical distance between a mixture distribution of the metric formed by the samples and a parametric statistical mixture distribution.

6. The method of claim 1, wherein at least one of the segments includes a set of contiguous time samples with a similar performance metric.

7. The method of claim 1, further comprising: providing information technology services, wherein the sampling and detecting are part of the information technology services.

8. The method of claim 1, further comprising determining that the particular segment associated with the characteristics of the at least one performance metric that are different than characteristics of the at least one performance metric that are associated with the other compared segments is a segment related to a performance mode change in service relative to other segments.

9. The method of claim 1, wherein determining that the particular segment associated with the characteristics of the at least one performance metric that are different than characteristics of the at least one performance metric that are associated with the other compared segments indicates a problem with the computer-based service.

10. The method of claim 1, further comprising triggering an alert based on the identified segment.

11. A controller comprising:
    at least one central processing unit (CPU) to provide a computer-based service; and
    a performance evaluator executable on said at least one CPU to:
        sample at least one performance metric of the computer-based service to form time samples of said at least one performance metric;
        arrange the time samples in segments based on a statistical analysis of the samples; and
        evaluate the segments to identify a segment that exhibits different characteristics of the at least one performance metric relative to other segments.

12. The controller of claim 11, wherein the performance evaluator forms clusters of the segments such that the segments of each cluster are statistically closer to each other than the segments not in the cluster.

13. The controller of claim 12, wherein the performance evaluator minimizes a statistical distance between a mixture distribution of the performance metric formed by the time samples and a predetermined statistical mixture distribution.

14. The controller of claim 13, wherein the parametric statistical mixture distribution comprises a Gaussian mixture distribution.

15. The method of claim 11, further comprising determining that the segment exhibiting different characteristics of the at least one performance metric relative to other segments is a segment related to a performance mode change in service relative to the other segments.

16. An article comprising a computer accessible storage medium containing instructions that when executed by a processor-based system cause the processor-based system to:
    sample at least one performance metric of the computer-based service to form time samples of said at least one performance metric;
    arrange the time samples into segments based on a statistical analysis of the samples; and
    evaluate the segments to identify one segment that exhibits anomalous characteristics of the at least one performance metric relative to other segments.

17. The article of claim 16, the storage medium containing instructions that when executed by the processor-based system cause the processor-based system to form clusters of the segments such that the segments of each cluster are statistically closer to each other than the segments not in the cluster.

18. The article of claim 17, wherein the segment exhibiting the anomalous characteristics of the at least one performance metric is not located in any of the clusters.

19. The article of claim 16, the storage medium containing instructions that when executed by the processor-based system cause the processor-based system to determine statistical distances among the segments to cluster the segments.

20. The controller of claim 16, further comprising determining that the segment exhibiting anomalous characteristics of the at least one performance metric relative to other segments is a segment related to a performance mode change in service relative to the other segments.

21. A method comprising:
sampling, by a processor, at least one performance metric of a computer-based service to form time samples of the performance metric;
arranging, by a processor, the time samples into segments of contiguous time samples based on a statistical analysis of characteristics of the at least one performance metric associated with the time samples;
forming, by a processor, clusters of the segments; and
detecting, by a processor, an occurrence of an anomalous segment relative to the clusters.

22. The method of claim 21 wherein detecting an occurrence of an anomalous segment relative to the clusters includes detecting that a segment is not within any of the clusters.

23. The method of claim 21, wherein clustering the segments comprises clustering the segments such that the segments of each cluster are statistically more similar to each other than the segments not in the cluster.

* * * * *

UNITED STATES PATENT AND TRADEMARK OFFICE
CERTIFICATE OF CORRECTION

PATENT NO. : 7,930,593 B2  
APPLICATION NO. : 12/243262  
DATED : April 19, 2011  
INVENTOR(S) : Mehmet Kivanc Ozonat It is certified that error appears in the above-identified patent and that said Letters Patent is hereby corrected as shown below:

In column 1, line 5, below "Title"  
insert -- "CROSS REFERENCE TO RELATED APPLICATIONS This Application claims the benefit of U.S. Provisional Application serial number 61/074,770, filed Jun. 23, 2008, titled "Segment Based Technique And System For Detecting Performance Anomalies And Changes For A Computer Based Service" which is hereby incorporated by reference herein as if reproduced in full below." --.

Signed and Sealed this  
Twentieth Day of September, 2011

David J. Kappos  
*Director of the United States Patent and Trademark Office*